United States Patent Office 3,185,747
Patented May 25, 1965

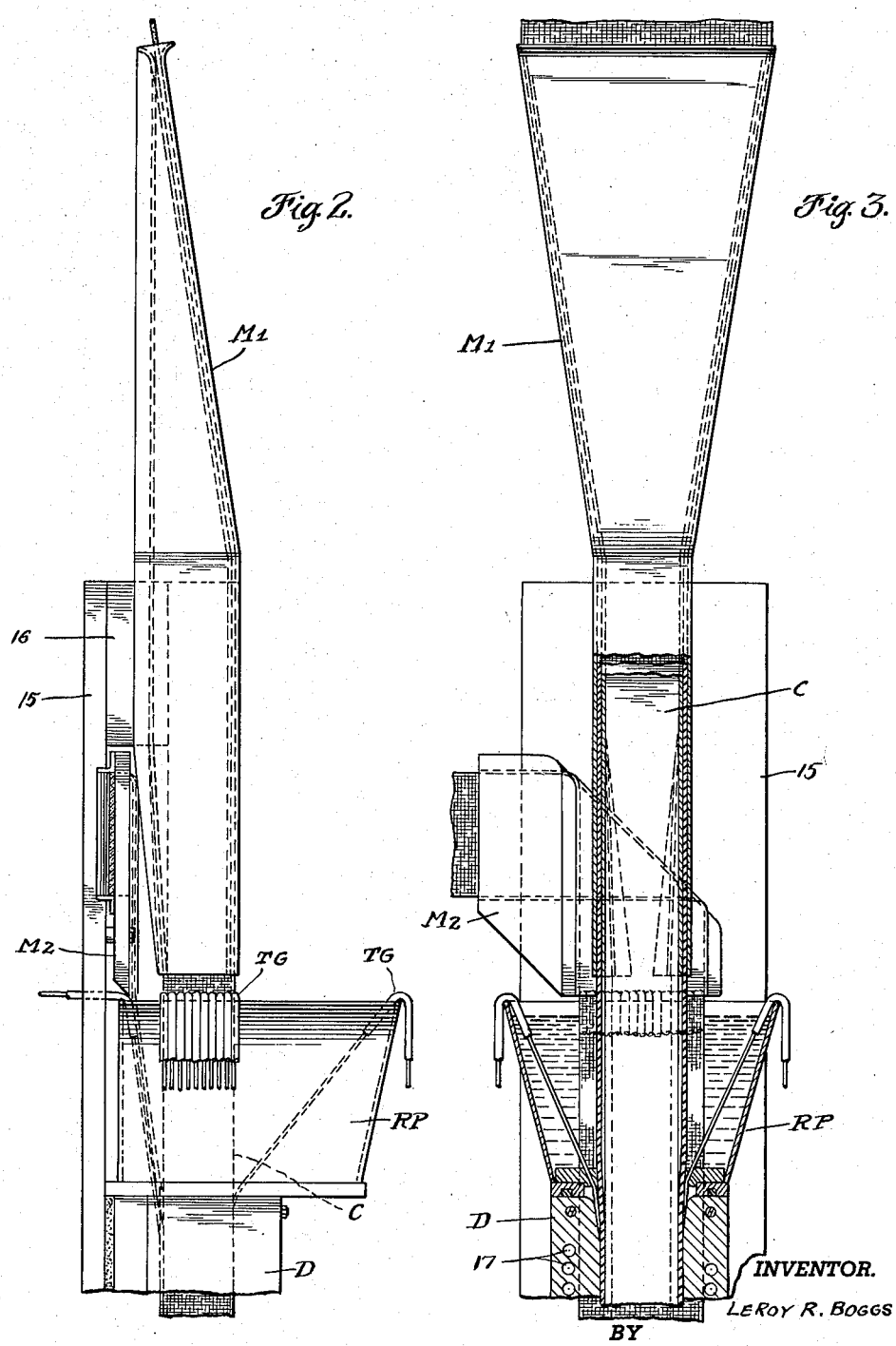

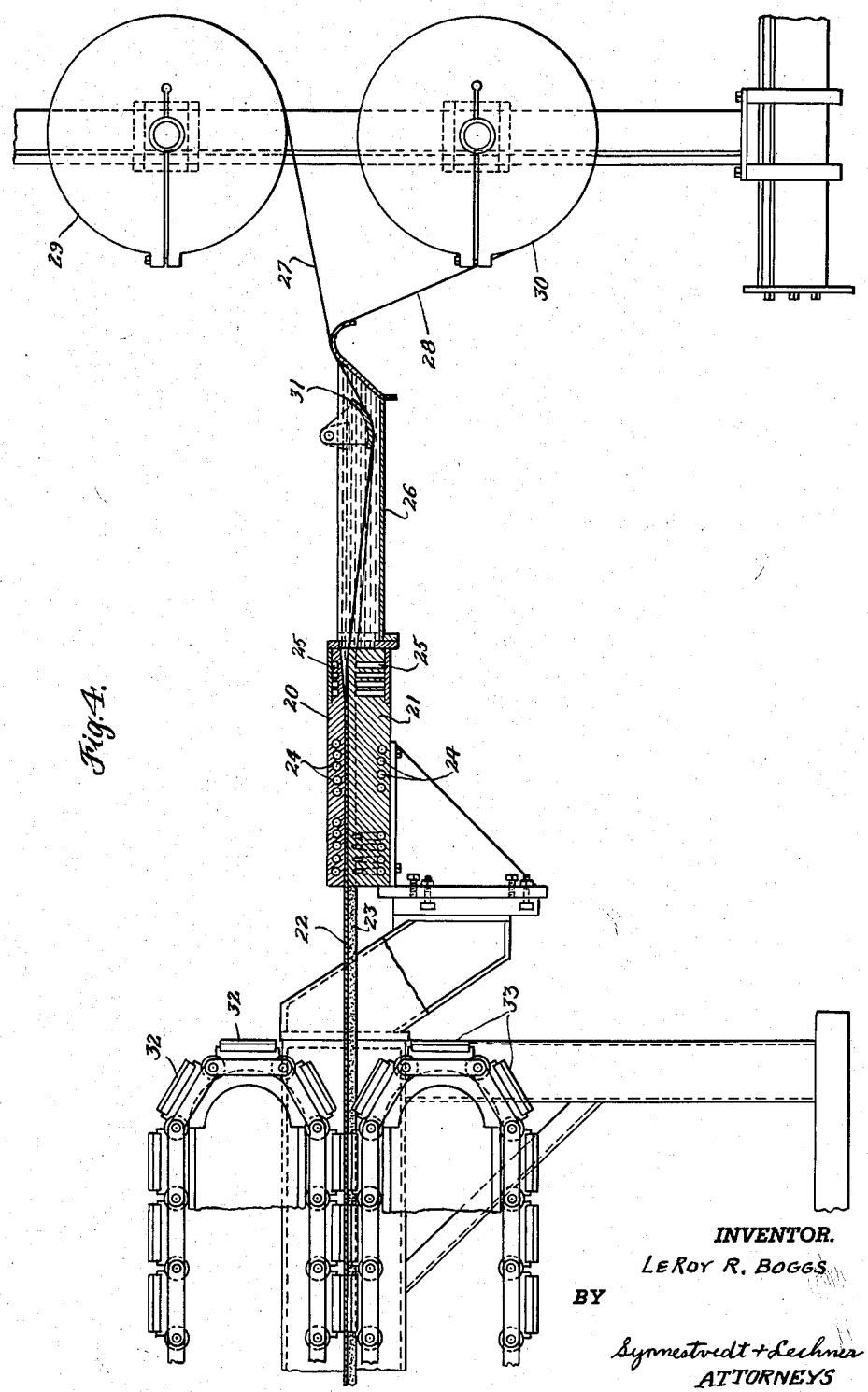

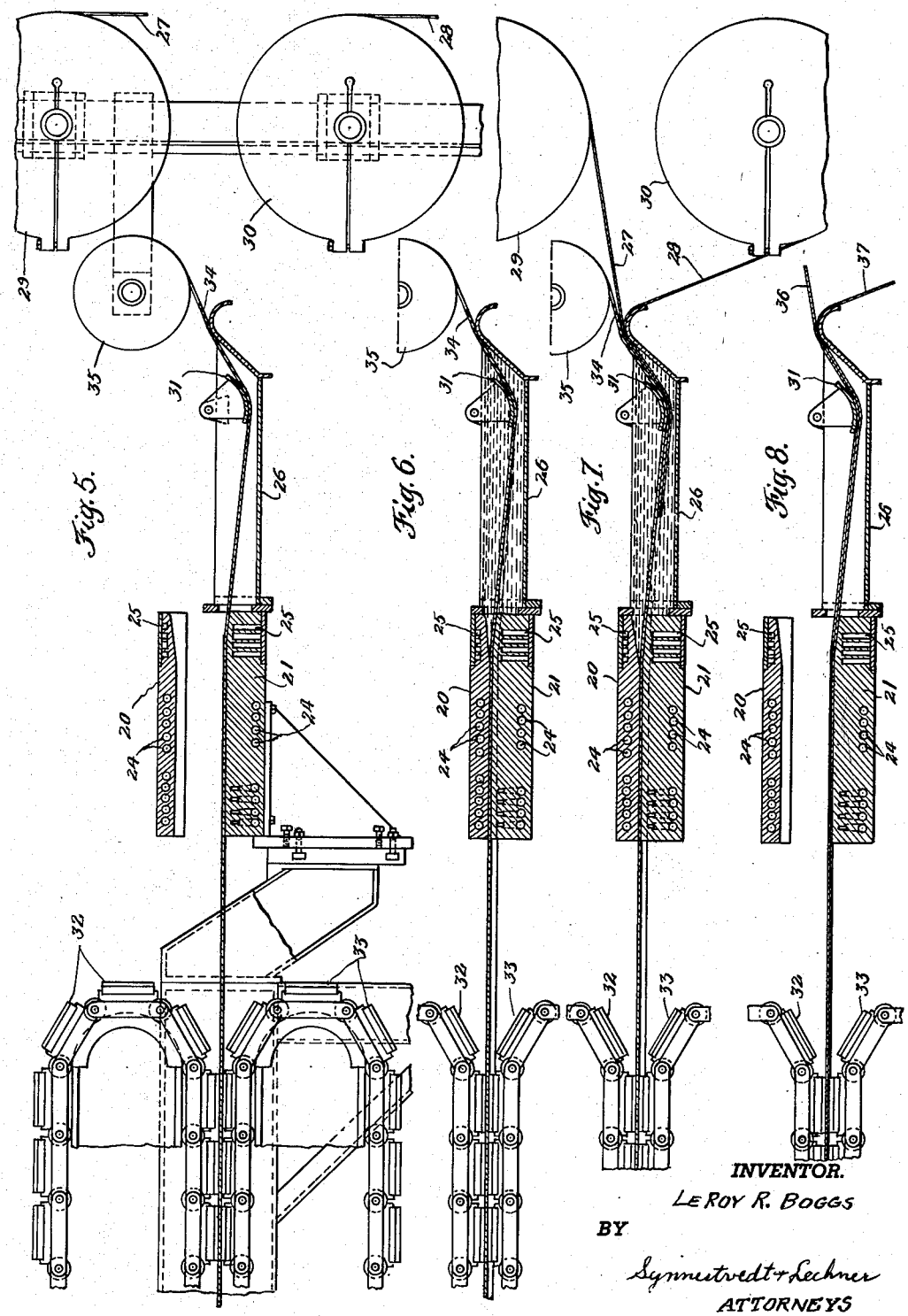

3,185,747
METHOD FOR INITIATING AN OPERATION FOR MAKING FIBER REINFORCED PLASTIC ARTICLES
Le Roy R. Boggs, Bristol, Tenn., assignor to Universal Moulded Fiber Glass Corp., Bristol, Va., a corporation of Delaware
Filed Dec. 26, 1962, Ser. No. 247,189
8 Claims. (Cl. 264—209)

This invention relates to a method for initiating an operation for making fiber reinforced plastic articles, and is particularly concerned with initiating the operation of certain types of equipment for producing fiber reinforced plastic articles as disclosed, for example, in my copending applications Serial Nos. 44,050, filed July 20, 1960 and 115,633, filed June 8, 1961, of which the present application is a continuation in part.

In application 44,050 I have disclosed what may be termed a vertical arrangement of a machine of the type here involved in which a forming device having a vertically extended forming passage therethrough is heated in order to cure the resin which is passed downwardly through the passage by feeding therethrough fiber reinforcement impregnated with a liquid heat curable resin material. In the arrangement of said application 44,050, a resin pan or receptacle is arranged above the forming device and a puller mechanism is arranged below the forming device, the dry fiber reinforcement element or elements, for instance glass fiber rovings or mats or woven fabrics, are fed downwardly through the resin in the resin pan to be impregnated therein and thence downwardly through the forming passage in the forming device wherein the resin is heated to solidify the article, the solidified article being engaged by the puller mechanism below the forming device and drawn downwardly through the system thereby. In said application Serial No. 115,633 a resin pan, a forming device and a puller mechanism is also used, but in one embodiment in that case these elements of the system are arranged in a horizontal sequence rather than in a vertical sequence.

In both the vertical and the horizontal arrangements above referred to the entrance end of the forming passage in the forming device communicates with the resin receptacle at a level below the level of the resin therein and this is advantageous for a number of reasons brought out in said prior applications. However, with the arrangement of the entrance end of the forming passage in relation to the resin in the resin receptacle as just referred to, certain difficulties are encountered in initiating the operation, because unless provision is made to the contrary, liquid resin introduced into the resin receptacle may run or flow into and through the forming passage in an uncontrolled manner.

The present invention is especially concerned with a method for initiating the operation for making fiber reinforced resin articles in equipment of the kind just referred to in which (whether vertically or horizontally arranged) the entrance end of the forming passage communicates directly with the resin in the resin reservoir. In accordance with the invention a special sequence of steps is employed in order to provide for initiation of the operation without encountering undesired or uncontrolled flow of liquid resin through the forming passage before the operation is actually started.

This sequence of steps or operations briefly is as follows:

First, dry or unimpregnated fiber reinforcement is threaded through the resin receptacle and through the forming passage in the forming device, and this is done in the absence of resin in the resin receptacle, and preferably also with the forming device at a temperature below the resin curing temperature. The leading end of the fiber reinforcement is then placed in engagement with the puller mechanism but with the puller mechanism inactive. The forming device or die structure is then heated to the temperature required to cure the resin being employed. Thereafter liquid resin is introduced into the resin receptacle and the puller mechanism is started. By following this sequence of steps, the liquid resin can enter the entrance end of the forming passage only after the reinforcement has been placed in the forming passage and after the die structure has been heated to the resin curing temperature. Uncontrolled or undesirable flow of the liquid resin through the system is therefore avoided at any point in the initiation of the operation.

How the foregoing objects and advantages are obtained will appear more fully from the following description of the accompanying drawings which illustrate preferred embodiments of the invention and in which:

FIGURE 1 is a view corresponding to FIGURE 1 of application 44,050 and is an elevational view of a machine for producing two articles at the same time, for instance a rain gutter and a downspout, the left hand unit of the machine shown being used for producing the downspout and the right hand unit for the gutter, and having parts broken away in the lower portion of this view to reduce the height thereof;

FIGURE 2 is an enlarged fragmentary view of portions of the left hand unit of FIGURE 1, this view being taken from the left of FIGURE 1 and showing certain parts in vertical section;

FIGURE 3 is a view of the parts shown in FIGURE 2 but shown in vertical section taken in the same direction as FIGURE 1 but at right angles to FIGURE 2;

FIGURE 4 is a view substantially in accordance with FIGURE 13 in application 115,633, illustrating a second embodiment, certain parts being broken away and shown in vertical section, as will further be described;

FIGURE 5 is a view of the equipment shown in FIGURE 4 but illustrating one of the steps involved in initiating the operation;

FIGURE 6 is a view of the equipment of FIGURES 4 and 5 but illustrating a further step in the starting procedure;

FIGURE 7 is a view of the equipment of FIGURES 4 to 6 but illustrating still another step; and FIGURE 8 is a view of equipment in accordance with FIGURE 4 but illustrating a modified embodiment of the starting procedure applicable to the equipment of FIGURE 4.

Figure 1:
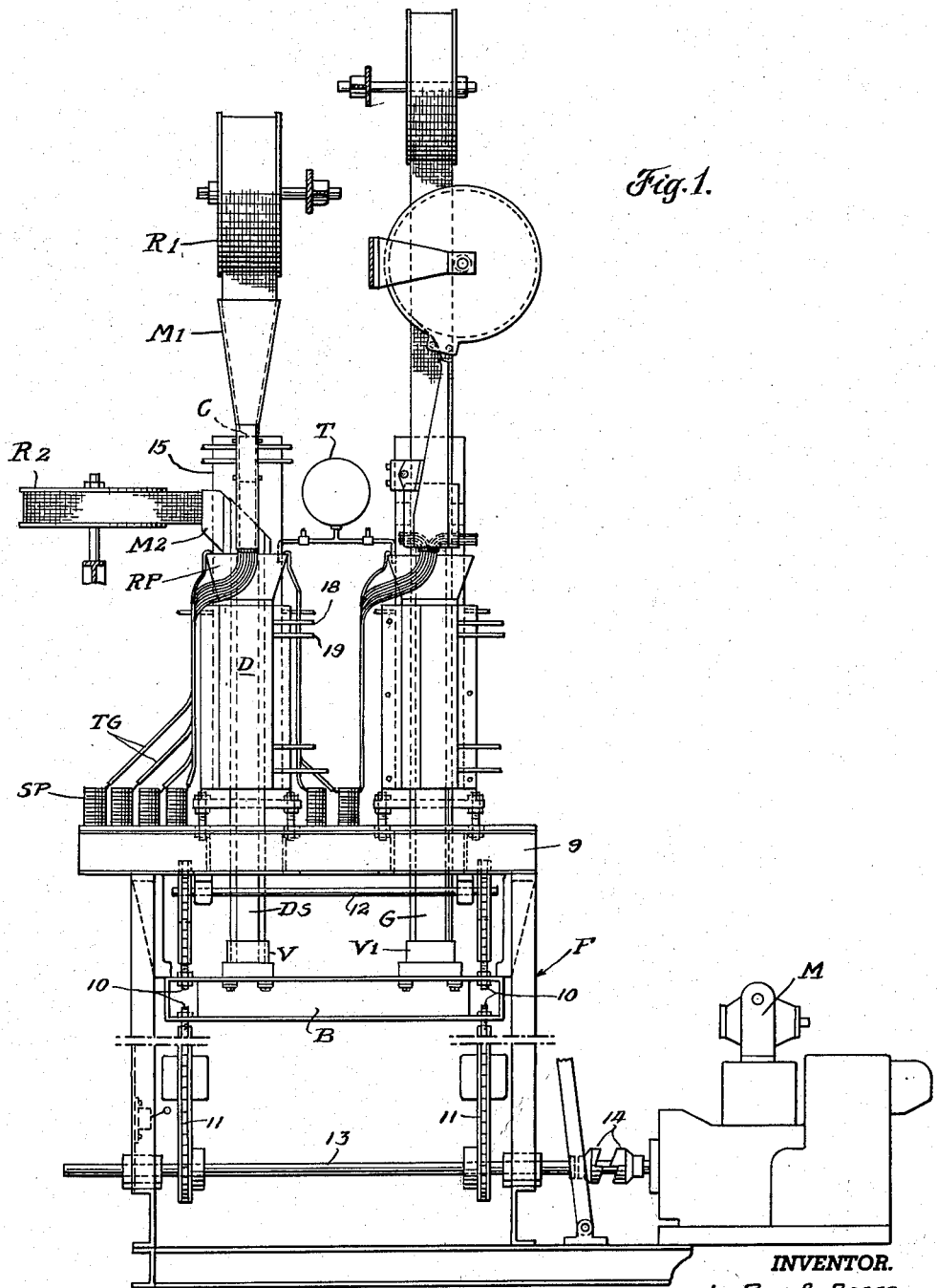

Turning now to the first embodiment of the equipment with which the method of the present invention is usable, it is first pointed out that this equipment is arranged vertically, i.e., the flow of the fiber reinforcement being from a high point downwardly through the forming device, and the puller mechanism being located below the forming device.

Before explaining the starting procedure employed according to the present invention when using the equipment of FIGURES 1 to 3, reference is made to the structure shown in those figures and also to the normal operation thereof.

As mentioned above, in FIGURE 1 there is illustrated an apparatus incorporating two units or machines, the left hand unit being arranged to produce downspout, and the right hand unit being arranged to produce a rain gutter. in FIGURE 1 the downspout emerging from the lower end of the left hand unit is indicated by the letters DS, and the gutter is indicated emerging from the lower end of the right hand unit by the letter G. A downspout of the type adapted to be produced by the left hand unit is also fully disclosed in my copending application Serial No. 88,405, filed February 10, 1961, and a gutter of the type adapted to be produced by the right hand unit is more fully disclosed in my copending application Serial No. 4,710, filed January 26, 1960.

For purposes of the present description, it will suffice to give some consideration to the arrangement of the downspout unit only, and the following description will be limited to that portion of the apparatus of FIGURE 1, various parts of the downspout unit also being shown in FIGURES 2 and 3.

Referring now to FIGURE 1, both the downspout DS and the gutter G are adapted to be drawn simultaneously through the apparatus by a single clutch controlled reduction gear drive motor M. Separate operation of these two units could of course be employed, but when simultaneously operated, the leading ends of both the downspout DS and the gutter G are clamped to a vise beam B by means of vises V and V1, respectively.

The apparatus in general comprises suitable framework F mounted on a firm foundation such as a floor or base which frame carries not only the vise beam B and its actuating mechanism, but also the other or upper portions of the apparatus including the forming dies and certain of the parts associated therewith. Mat reels R1 and R2 supply strip or mat form of glass fiber reinforcement to the downspout unit, this unit also being supplied with rovings from spools SP, preferably also of glass fiber. The rovings are fed through tubular guides TG. The unit further consists of a forming device comprising a die structure D and a core structure C which are mounted on the horizontal framing parts 9 of the framing structure F. The die and core cooperate to provide an annular passage for the feed of the glass fiber reinforcement and of the resin to effect the formation thereof and thereby produce the downspout. At the upper end of the die structure D there is arranged a resin reservoir or pan which is identified by the letters RP this resin pan being supplied with liquid heat settable or heat curing resin from the supply tank T, the level of which is indicated in FIGURE 3. The mat or fabric reinforcements supplied from the reels R1 and R2 are preshaped in their passage from the reels into the resin bath by means of mat guides indicated at M1 and M2. This preshaping provides for bending of the mats and delivery of various parts of the mats into different wall portions of the downspout being formed, so that all portions of the downspout will have fiber reinforcement therein.

Downward movement is imparted to the vise beam B to pull the preshaped dry mats, and the rovings through the resin pan RP, and this effects impregnation of the fiber reinforcement with the liquid resinous material prior to entrance thereof into the annular confining passage formed between the die and core elements of the forming device.

The impregnated mats are pulled downwardly through and extracted from the die or forming device as the beam B is moved downwardly. This downward movement of the beam is effected by a connection of the beam as indicated at 10 with the two ends of chain loops 11, the upper portions of which are carried by sprockets mounted on a shaft 12, and the lower portions of which are carried by sprockets mounted on a shaft 13. The shaft 13 is arranged for connection with the motor M by means of the disconnectible dog clutch 14.

Periodically the apparatus may be stopped and appropriate lengths of the downspout (and also of the gutter if this is also being made) may be cut off, and then the vise beam is raised again and the vises V and V1 clamped again to the free end of the pieces emerging from the dies, and the extraction of another length proceeds.

As will be seen in FIGURES 1, 2 and 3, the die structure D is mounted on a supporting plate 15 which is carried on the cross beams 9 of the main frame structure F. The mounting plate 15 for the die extends upwardly from the die as will be seen in FIGURES 1, 2 and 3, and toward its upper end this plate is provided with a bracket 16 by means of which the upper end of the core C is suspended within the cavity in the die.

The relationship of the resin pan RP to the die and core is best illustrated in FIGURES 2 and 3. As there seen, the resin pan is open at the bottom to communicate with the upwardly open end of the annular confining passage between the die and core, for ingress not only of the resin itself but also of the fiber reinforcement which is descending through the resin in the bath and into the forming device. The core of the die or the die itself is preferably provided with some taper in the inlet opening so that the impregnated fibrous materials entering the inlet end of the die will be effectively compressed or compacted and so that the excess resin with which the fiber reinforcement is impregnated will be expelled or ejected back up into the body of the resin in the resin pan.

Toward the upper end of the die, passages such as indicated at 17 in FIGURE 3 are provided for the circulation of a cooling liquid, such as water, either at ordinary supply temperature or, if desired, somewhat refrigerated. This cooling liquid may be delivered to and discharged from the passages 17 by supply and discharge connections 18 and 19.

In the mid region of the die there are heating means, advantageously in the form of electrical heating elements (not shown) located for example in drilled chambers provided in the walls of the die and providing for heating of the die or forming device to effect curing of the resin. In zones or regions generally corresponding to the cooling and heating zones of the die mentioned above, the core C is also preferably provided with similar zones for cooling and heating. The heating of the resin as it passes through the die effects solidification of the article being formed.

From the foregoing, the general arrangement of the parts utilized in the embodiment of apparatus shown in FIGURES 1, 2 and 3 will be clear. Further details may be noted, if desired, by reference to the more detailed description appearing in my copending application Serial No. 44,050. Likewise, the general nature of the operation will be apparent from the description already given.

From the above it will be seen that in the normal operation of the apparatus shown in FIGURES, 1, 2 and 3, both mats of fibrous reinforcement, and also rovings, both of them preferably of glass fibers, are fed downwardly through the resin pan where they are impregnated and are thence delivered into the upper end of the forming passage, the solidified or formed article being gripped by the puller mechanism below the forming device and drawn downwardly thereby.

In accordance with the present invention, in order to initiate the operation of apparatus of the kind shown in FIGURES 1, 2 and 3, and described above, the following sequence of steps is preferably followed. First note that the threading operation to be described is performed in the absence of resin in the resin pan, and the threading is also advantageously effected with the die at a temperature below resin curing temperature, and with the puller mechanism inactive.

The rovings or similar reinforcement material are normally the first to be threaded through the die. This may conveniently be done by passing a loop of thin wire such as piano wire upwardly through the die and roving guide tubes. The roving is then threaded through the loop of the wire for three or four feet. The wire with the roving looped through it is then withdrawn back down through the guide tubes, and die and enough roving is pulled through the tube to provide adequate material for tying to the beam B. This procedure is repeated for each strand of roving involved in the article to be produced.

The next step is the threading of the mat material from the mat reels to the bottom of the die. This is done by trimming the leading edge of a given piece of mat into a point and attaching to each face of the point long strips of adhesive tape. The tape is attached to the mat for a distance of some two or three feet back from the point and the remaining portions of the adhesive tapes which protrude ahead of the point a distance of some ten or twelve feet are stuck together face to face. Aluminum foil adhesive tape such as Minnesota Mining and Manufacturing Company aluminum foil tape No. 425 has been found to be suitable for this purpose. The tape leader formed in the above manner is then threaded through the mat guide and the die, and the mat is drawn through the guide and the die by pulling on the tape leader from the bottom. The mats are pulled down past the bottom end of the die a sufficient distance to provide adequate material for wrapping around the beam B. The reinforcing material, that is the rovings and the mat, after being wrapped around the beam is impregnated with a room temperature curing resin to secure it to the beam. In the event that a weak mat is being employed as the central portion of the laminate between two stronger mats which are fed through a common mat guide, it is threaded between two face mats or strong mats which have already been threaded in the above manner as far as possible by hand, which is usually to the top entrance of the mat guide. The drive motor is then started which pulls the dry vehicle material through the mat guides and the die for some distance. At this point the die heaters are turned on and when the heated region of the die has come to temperature, the resin mixture is poured into the resin pan. Pulling on the reinforcement material is resumed at the desired production speed. An increase in load appears when the first portion of resin enters the curing region of the die. This is the critical point in the start-up procedure inasmuch as the entire pulling force is borne by the dry reinforcement material. The pulling stroke is continued until enough of the finished article is protruding from the bottom of the die for the vises to grip.

Thus, the starting procedure contemplated for use in connection with equipment such as illustrated in FIGURES 1, 2 and 3 provides for threading the dry reinforcement through the forming passage in the die or forming device in the absence of resin in the resin pan and with the forming device at a temperature below resin curing temperature. Moreover, during this initial threading operation the puller mechanism is for the most part inactive, although it may be utilized as a means for assisting the threading. After the threading has been completed and the dry reinforcement elements fastened to the puller mechanism, the die or forming device is heated and then resin is introduced into the resin pan and the puller mechanism started. In this way, uncontrolled flow of liquid resin downwardly into the forming passage of the die during the threading operation is avoided.

It will be noted that the foregoing starting operation is described with reference to a die structure having an annular forming passage, the threading operation being effected without separation of any die parts.

Turning now to the embodiment of the equipment as illustrated in FIGURES 4 to 7 inclusive, it will first be noted that in this embodiment the equipment is arranged for horizontal feed of the reinforcement and of the article being formed, rather than the feed in the vertical direction, as in the embodiment of FIGURES 1 to 3. Moreover, as will be developed herebelow the invention is illustrated in FIGURES 4 to 7 as applied to equipment in which the die structure or forming device is of multipart construction, so that parts of the die may be separated in order to open up the forming passage and facilitate the threading operation.

In FIGURE 4 the forming device is indicated as made up of an upper part 20 and a lower part 21 which are relatively separable and which when assembled provide a forming passage therebetween in this case in the form of a channel shaped passage so as to produce an article of channel form, the web of which is indicated at 22 in FIGURE 4 and one of the flanges is indicated at 23. For various details of the construction of these die parts, reference may be made to my copending application Serial No. 115,633 above mentioned in which the specific construction of the forming device shown in FIGURE 4 is fully disclosed. For the present purposes it will suffice to point out that the two die parts 20 and 21 are separable and that they are both provided with cavities 24 for receiving heating elements in the mid region of the die parts and also with cavities 25 providing for circulation of a cooling medium in the entrance end region of the parts. Similar cooling passages may be provided in the delivery end of the die parts, if desired, as is brought out in copending application 115,633. Associated with the entrance end of the forming device is a resin pan 26 adapted to receive a charge of liquid heat curable resin as is indicated in the figure, the resin pan and the die structure being associated with each other in such manner that the entrance end of the forming passage opens directly into the resin pan at a level beneath the top surface of the charge of liquid resin therein. Fiber reinforcement strips, for instance fiber glass mat strips 27 and 28 are fed from supply reels 29 and 30 into the resin in the pan 26 and under a guide 31 and from there into the entrance end of the forming passage between the die parts 20 and 21. The impregnated fiber reinforcement is thus passed through the forming passage of the die structure and the heating of the resin effected by means of the heater elements inserted in cavities 24 cures the resin as it is passing through the forming passage and thereby solidifies the article within the die structure. As the article emerges from the delivery or discharge end of the forming passage it is engaged by the gripping blocks 32 and 33 of the puller mechanism, these sets of blocks 32 and 33 being connected in series representing crawler type gripping devices which may be arranged in the manner more fully disclosed in my copending application Serial No. 142,749, filed September 18, 1961.

The gripping of the formed piece by the crawler puller mechanism provides for pulling of the formed article through the die structure and also for feed of the reinforcement elements from their source through the resin bath and into the die structure.

As in the vertical arrangement described above with reference to FIGURES 1 to 3, the arrangement of FIGURE 4 is also characterized by a direct communication of the entrance end of the forming passage with the body of liquid resin in the resin reservoir, in consequence of which, in absence of provision to the contrary, there would be freedom for uncontrolled flow of liquid resin into the entrance end of the forming passage during the initiation of the operation of the apparatus. This is avoided by employing the starting method of the present invention, according to which the following sequence of steps is used. It is here to be noted that the following sequence of steps still further overcomes another difficulty which arises in certain operations such as that described just above with the reference to FIGURE 4. Thus it is contemplated in accordance with the technique illustrated in FIGURE 4 to employ glass fiber mats for the reinforcement elements in the article being made. Such mats customarily consist of randomly oriented glass fibers and have relatively low tensile strength. Indeed the strength of such mats as may be employed in making various articles is insufficient to resist the pull encountered in the initiation of the operation. The sequence of steps now to be described also takes care of this problem.

Turning now to FIGURE 5, the apparatus there shown is the same as that illustrated in FIGURE 4, but as here shown the two parts of the die 20 and 21 have been separated, and no resin is present in the resin pan 26. Although the mats 27 and 28 and their supply reels 29 and 30 are shown toward the right of FIGURE 5, it will be observed that the mats 27 and 28 are not illustrated as being threaded through the apparatus. Instead a different and temporary reinforcement indicated at 34, supplied from a temporary reel 35, is shown as being threaded through the resin pan, through the position of the forming passage between the die parts 20 and 21 and into engagement with the gripping blocks 32 and 33 of the puller mechanism. This reinforcement 34 is constructed to have higher tensile strength than the mats 27 and 28. For example the reinforcement 34 may comprise a strip of woven glass fabric having sufficient tensile strength to withstand the forces encountered in the starting operation. After threading the temporary reinforcement through the system as indicated in FIGURE 5, the die parts 20 and 21 are then brought together and secured to each other in normal position. The die structure is then heated, as by means of heating elements in the cavities 24 already referred to, and when the die parts have approached or reached resin curing temperature the charge of liquid resin is introduced into the resin pan, as indicated in FIGURE 6, and the operation is now ready for starting, which is effected by operating the drive system for the crawler treads of the puller mechanism.

As the reinforcement 34 progresses through the resin in the resin pan and through the die, the article is formed, as is indicated toward the left of FIGURE 7, and when cured and solidified article has passed through the system and has reached the region of effective engagement by the puller mechanism, the mats 27 and 28 which comprise the normal reinforcement for the article being made are fastened (for instance adhesively or by stitching) to the temporary reinforcement 34 and the mats 27 and 28 are thereby drawn by means of the reinforcement 34 into the resin pan as is indicated in FIGURE 7 and thereafter through the die structure 20-21 and ultimately to and through the puller mechanism. The feed of the temporary woven fabric reinforcement 34 along with the mats 27 and 28 is preferably continued at least until the leading ends of the mats have passed the zone in the die structure where the article is solidified. At that time the feed of the temporary reinforcement 34 may be terminated and the normal operation will proceed, using only the mats 27 and 28 for reinforcement, as is indicated in FIGURE 4.

The foregoing sequence of steps not only takes care of the problem encountered where the normal reinforcement is too weak to withstand the loads encountered in starting, but also avoids uncontrolled or undesirable flow of liquid resin from the resin pan, as would occur if the charge of resin was introduced into the resin pan prior to the assembly of the parts of the die structure and prior to the heating of the die structure to the resin curing temperature.

Turning now to the embodiment of the invention illustrated in FIGURE 8 it is first noted that it is here assumed that the particular reinforcement elements shown at 36 and 37 here employed are of adequate strength to withstand the forces encountered in the start-up procedure. Thus, for example, these reinforcements may be assumed to comprise woven glass fabrics. In such case it is not necessary to resort to the use of a temporary reinforcement, as in FIGURES 5, 6 and 7, but, instead the normal reinforcement may be threaded all the way through the system as is shown in FIGURE 8. During this threading operation, however, the resin is not present in the resin pan and the die structure is preferably not heated to curing temperature. After the threading has been accomplished, the die structure is closed and is heated as described above, whereupon resin is introduced into the resin pan and the puller mechanism started. This sequence of steps is similar to that described above with reference to FIGURES 1 to 3, although in FIGURE 8 the die structure has been opened, whereas in FIGURES 1 to 3 the threading was accomplished with the die parts assembled. In addition, in FIGURE 8, the equipment is arranged for horizontal feed, whereas in FIGURES 1 to 3 the equipment is arranged for vertical feed; but in FIGURE 8 as in FIGURES 1 to 3 the entrance end of the forming passage in the die structure opens directly to the body of liquid resin in the resin reservoir. The use of the starting procedure of the invention with the equipment as illustrated in FIGURE 8 therefore avoids undesired flow of resin from the resin pan during the starting operation, just as it does when the method of the invention is used in connection with the vertical system of FIGURES 1 to 3.

Herein, in connection with the horizontal arrangement of FIGURES 4 to 8 where reference is made to threading of reinforcements through the system in the absence of resin in the resin pan or resin receptacle, it will be understood that it would not always be necessary to have the resin pan or receptacle completely empty, the important requirement being that the resin is below the level of the entrance end to the forming passage in the die structure. However, if the equipment is shut down for any extended length of time, whether for threading or otherwise, uncured resin should not be permitted to remain in the resin pan for time sufficiently long to harden.

In the embodiment of FIGURES 1 to 3, the threading of the reinforcement elements is effected through the forming passage with the die parts assembled; whereas in the embodiments of FIGURES 4 to 8, threading of the reinforcements is accomplished while the die parts are separated. In both cases, however, the threading is accomplished through the space representing the die passage and in either event this is herein considered as a threading of the reinforcements through the forming passage.

With respect to the resin materials contemplated for use in accordance with the invention, it may be mentioned that any of the well known heat settable or heat curable resins may be employed, for instance the so called laminating polyester resins, and since the specific nature of the particular resin used is not a part of the present invention per se, this matter need not be considered in detail herein.

It may also be mentioned that although glass fiber reinforcements constitute the preferred embodiment of reinforcements employed according to the present invention, nevertheless fiber reinforcements generally may be used.

I claim:
1. A method for initiating an operation for making a fiber reinforced resin article in equipment comprising a forming device having a forming passage of cross section conforming to that of the article to be formed, a puller mechanism beyond the discharge end of the forming passage, and still further comprising a receptacle for a charge of liquid heat curable resin with the entrance end of the forming passage communicating with the resin receptacle below the top of the resin charge adapted to be received therein, which method comprises threading fiber reinforcement through the resin receptacle and into and through the communicating forming passage and into engagement with the puller mechanism, said threading being effected in the absence of resin in the resin receptacle and with the puller mechanism inactive, delivering a charge of liquid heat curable resin to the resin receptacle to a height above the entrance end of the forming passage and with the forming device heated to resin curing temperature, and starting the puller mechanism to thereby progressively impregnate fiber reinforcement with the liquid resin and to advance the impregnated reinforcement through the heated forming device to effect curing of the resin therein and solidification of the article being formed.

2. A method according to claim 1 in which the threading of the reinforcement is effected with the forming device at a temperature below the resin curing temperature, and in which the forming device is heated to the curing temperature before delivering the charge of resin to the receptacle.

3. A method according to claim 1 in which the forming device used in the operation comprises separable parts and in which said parts are separated during the threading step and further in which said parts are assembled before delivering the charge of resin to the resin receptacle.

4. A method for initiating an operation for making a resin article reinforced with a relatively low strength fiber reinforcement by means of equipment comprising a forming device having a forming passage of cross section conforming to that of the article to be formed, a puller mechanism beyond the discharge end of the forming passage and still further comprising a receptacle for a charge of liquid heat curable resin with the entrance end of the forming passage communicating with the resin receptacle below the top of the resin charge adapted to be received therein, which method comprises threading a temporary high strength fiber reinforcement through the resin receptacle and into and through the communicating forming passage and into engagement with the puller mechanism said threading being effected in the absence of resin in the resin receptacle and with the puller mechanism inactive, delivering a charge of liquid heat curable resin to the resin receptacle to a height above the entrance end of the forming passage and with the forming device heated to resin curing temperature, starting the puller mechanism to thereby progressively impregnate fiber reinforcement with the liquid resin and to advance the impregnated reinforcement through the heated forming device to effect curing of the resin therein and solidification of the article being formed, fastening said relatively low strength fiber reinforcement to the temporary fiber reinforcement to be drawn therewith by the action of the puller mechanism into and through the forming passage in the heated forming device, and terminating the feed of said temporary reinforcement after the leading end of said relatively low strength reinforcement has passed the point of curing of the resin in the forming device.

5. A start-up method for initiating the formation of fiber reinforced resin articles by means of a forming device having a generally upright forming passage therein and a reservoir for liquid heat curable resin arranged above the forming device to feed resin downwardly by gravity into the forming passage, which method comprises threading fiber reinforcement downwardly through the resin reservoir and through the forming passage, thereafter heating the forming device to a temperature sufficient to cure the heat curable liquid resin to be used, and thereafter charging the reservoir with said liquid heat curable resin and feeding fiber reinforcement and resin into the forming passage.

6. A method for initiating the operation for making a resin article reinforced with a relatively low strength fiber reinforcement by means of equipment comprising a heated forming device having a forming passage of cross section conforming to that of the article to be formed, a puller mechanism beyond the discharge end of the forming passage and still further comprising a receptacle for a charge of liquid heat curable resin, which method comprises threading a temporary high strength fiber reinforcement through the resin receptacle and the forming passage and into engagement with the puller mechanism, starting the puller mechanism to thereby progressively impregnate fiber reinforcement with the liquid resin and to advance the impregnated reinforcement through the heated forming device to effect curing of the resin therein and solidification of the article being formed, fastening said relatively low strength fiber reinforcement to the temporary fiber reinforcement to be drawn therewith by the action of the puller mechanism into and through the resin receptacle, and through the forming passage in the forming device, and terminating the feed of said temporary reinforcement when the leading end of said relatively low strength reinforcement has passed the point of curing of the resin in the forming device.

7. In the art of forming a solidified fiber reinforced resin article from fiber reinforcement impregnated with a liquid heat hardenable resin material, the method which comprises initially threading a fiber reinforcement element serially through a receptacle normally adapted to contain the liquid impregnating resin material and through and beyond the zone of a forming passage communicating with the receptacle and in which the resin material is normally heated to solidify the article, said threading being effected in the absence of impregnating resin material and without the solidifying heat, after said initial threading applying the solidifying heat to said zone, after application of the solidifying heat introducing the impregnating resin into said receptacle, and pulling on the reinforcement beyond the forming passage to advance the impregnated reinforcement through the forming passage.

8. In the art of forming a solidified fiber reinforced resin article from fiber reinforcement impregnated with a liquid heat hardenable resin material, the method which comprises initially threading a fiber reinforcement element comprising a strip of woven fabric serially through a receptacle normally adapted to contain the liquid impregnating resin material and through and beyond the zone of a forming passage communicating with the receptacle and in which the resin material is normally heated to solidify the article, said threading being effected in the absence of impregnating resin material and without the solidifying heat, connecting the leading end of a fiber reinforcing element comprising a strip of random fiber mat to the woven strip at a point upstream of the resin receptacle, after said initial threading applying the solidifying heat to said zone, after application of the solidifying heat introducing the impregnating resin into said receptacle, pulling on the reinforcement downstream of the forming passage to initiate the feed of impregnated reinforcement through the forming passage and thereby start the formation of the solidified article, and thereafter terminating the feed of the strip of woven fabric and continuing formation of the article reinforced with the strip of random fiber mat.

References Cited by the Examiner
UNITED STATES PATENTS

| 2,486,091 | 10/49 | Adams et al. | 156—461 XR |
| 2,812,796 | 11/57 | MacHenry | 156—436 XR |
| 2,887,721 | 5/59 | Blanchi et al. | 156—180 XR |
| 2,977,630 | 4/61 | Bozler | 156—500 XR |

ROBERT F. WHITE, *Primary Examiner.*

EARL M. BERGERT, *Examiner.*